US011388223B2

(12) United States Patent
Hirai et al.

(10) Patent No.: US 11,388,223 B2
(45) Date of Patent: Jul. 12, 2022

(54) MANAGEMENT DEVICE, MANAGEMENT METHOD, AND MANAGEMENT PROGRAM

(71) Applicant: Hitachi, Ltd., Tokyo (JP)

(72) Inventors: Riu Hirai, Tokyo (JP); Goichi Ono, Tokyo (JP); Daisuke Ishii, Tokyo (JP); Yuji Ogata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 110 days.

(21) Appl. No.: 16/937,262

(22) Filed: Jul. 23, 2020

(65) Prior Publication Data

US 2021/0037084 A1 Feb. 4, 2021

(30) Foreign Application Priority Data

Jul. 29, 2019 (JP) .............................. JP2019-139086

(51) Int. Cl.
*H04L 67/10* (2022.01)
*G06N 20/00* (2019.01)
*G06N 3/08* (2006.01)

(52) U.S. Cl.
CPC .............. *H04L 67/10* (2013.01); *G06N 20/00* (2019.01); *G06N 3/08* (2013.01)

(58) Field of Classification Search
CPC .......... H04L 67/10; G06N 20/00; G06N 3/08; G06N 3/0454; G06K 9/4628; G06K 9/00671; G06V 20/20
See application file for complete search history.

(56) References Cited

U.S. PATENT DOCUMENTS 9,120,484 B1 * 9/2015 Ferguson ............... B60W 40/06
10,013,773 B1 * 7/2018 Ogale ....................... G06N 3/08
(Continued)

FOREIGN PATENT DOCUMENTS

CN 107067015 A 8/2017
EP 3373200 A1 9/2018

OTHER PUBLICATIONS

Extended European Search Report for related European Patent Application No. 20186830.4, dated Dec. 11, 2020 (9 pages).
(Continued)

*Primary Examiner* — Javier O Guzman
(74) *Attorney, Agent, or Firm* — Procopio, Cory, Hargreaves & Savitch LLP

(57) ABSTRACT

To improve learning accuracy, while avoiding transferring of a dataset from an edge terminal to a cloud server. A management device accessible to a target object to be managed has a processor executing a program, a storage device storing the program, and a communication interface communicable with the target object. The processor executes a reception process for receiving first environmental information representing a first environment of the target object, a first generation process for generating relevant information representing relevancy between the first environmental information and second environmental information representing a second environment of the target object, a second generation process for generating a first learned model for inference by the target object in the first environment based on the relevant information and a second learned model for inference by the target object in the second environment, and a transmission process for transmitting the first learned model to the target object.

13 Claims, 20 Drawing Sheets

(56) References Cited

U.S. PATENT DOCUMENTS

| | | | |
|---|---|---|---|
| 10,031,526 B1* | 7/2018 | Li | G05D 1/0246 |
| 10,032,111 B1* | 7/2018 | Bertram | G09B 9/052 |
| 10,060,751 B1* | 8/2018 | Chen | G01C 21/32 |
| 10,957,201 B2* | 3/2021 | Do | G08G 1/0965 |
| 2010/0097456 A1* | 4/2010 | Zhang | G08G 1/166 |
| | | | 348/119 |
| 2013/0261966 A1* | 10/2013 | Wang | G01C 21/3469 |
| | | | 701/400 |
| 2018/0253647 A1* | 9/2018 | Yu | G06F 17/16 |
| 2018/0322365 A1* | 11/2018 | Yehezkel Rohekar | |
| | | | G06N 3/0454 |
| 2018/0322382 A1* | 11/2018 | Mellempudi | G06F 7/487 |
| 2018/0373963 A1* | 12/2018 | Lo | G05D 1/0246 |
| 2019/0004534 A1 | 1/2019 | Huang et al. | |
| 2019/0042955 A1* | 2/2019 | Cahill | G06N 5/04 |
| 2019/0138908 A1 | 5/2019 | Bernat et al. | |
| 2020/0092124 A1* | 3/2020 | Jeong | G06N 3/08 |
| 2020/0128072 A1* | 4/2020 | Trim | H04L 67/2847 |
| 2020/0133288 A1* | 4/2020 | Abari | G05D 1/0088 |
| 2021/0049127 A1* | 2/2021 | Kunchakarra | G06F 16/1734 |

OTHER PUBLICATIONS

Search Report and Written Opinion dated Aug. 20, 2021 from related SG Patent Application 10202007042X, 9 pages.

* cited by examiner

FIG. 3

| EDGE INFORMATION / EDGE NUMBER # | USE OF DNN (e1) | EDGE ENVIRONMENT (e2) | 3M INFORMATION (e3) | MAN INFORMATION (e4) | ... | TIME INFORMATION (ep) | MATCHED NUMBER (301) |
|---|---|---|---|---|---|---|---|
| 1 | 1 | 0 | 0 | 0 | ... | 0 | $h_1$ |
| 2 | 0 | 0 | 0 | 0 | ... | 0 | $h_2$ |
| ... | ... | ... | ... | ... | ... | ... | ... |
| i | 0 | 0 | 1 | 1 | ... | 0 | $h_i$ |
| ... | ... | ... | ... | ... | ... | ... | ... |
| n-1 | 0 | 0 | 0 | 0 | ... | 0 | $h_{n-1}$ |

$$LMn = \frac{LM1 \times h_1/\Sigma(h) + LM2 \times h_2/\Sigma(h) \cdots + LMi \times h_i/\Sigma(h) \cdots + LMn-1 \times h_{n-1}/\Sigma(h)}{n-1}$$

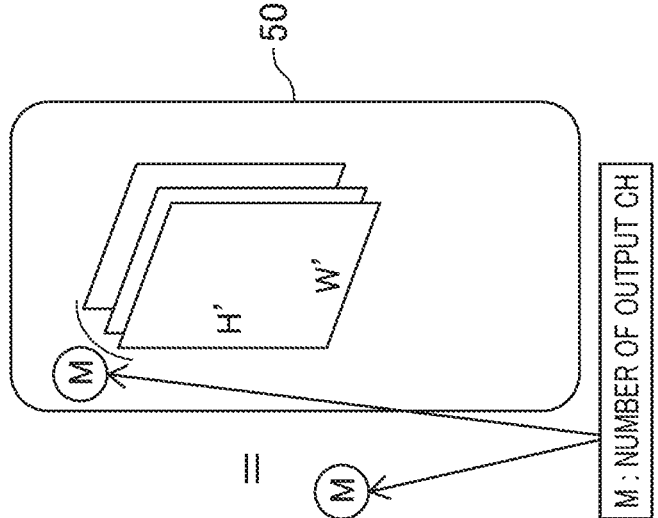
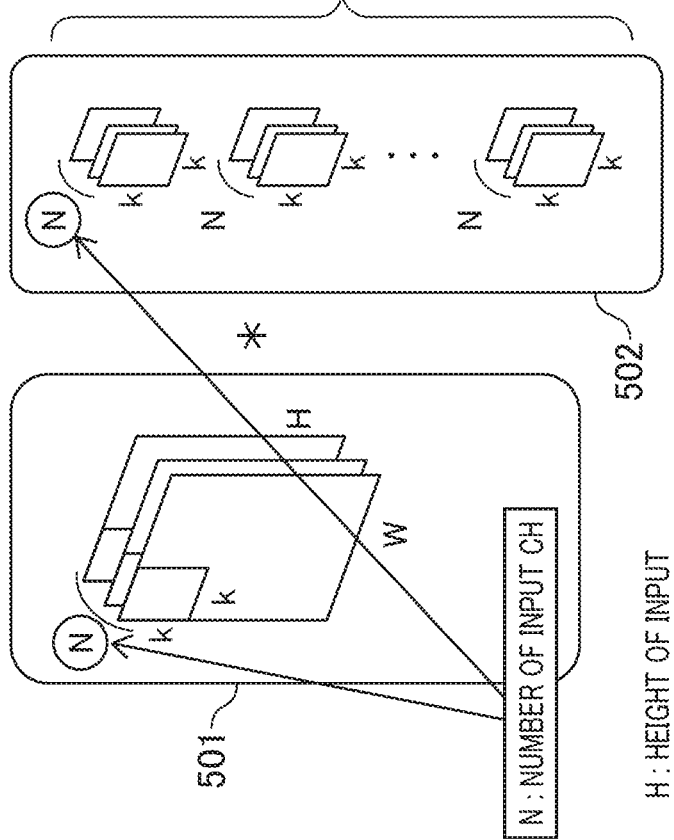

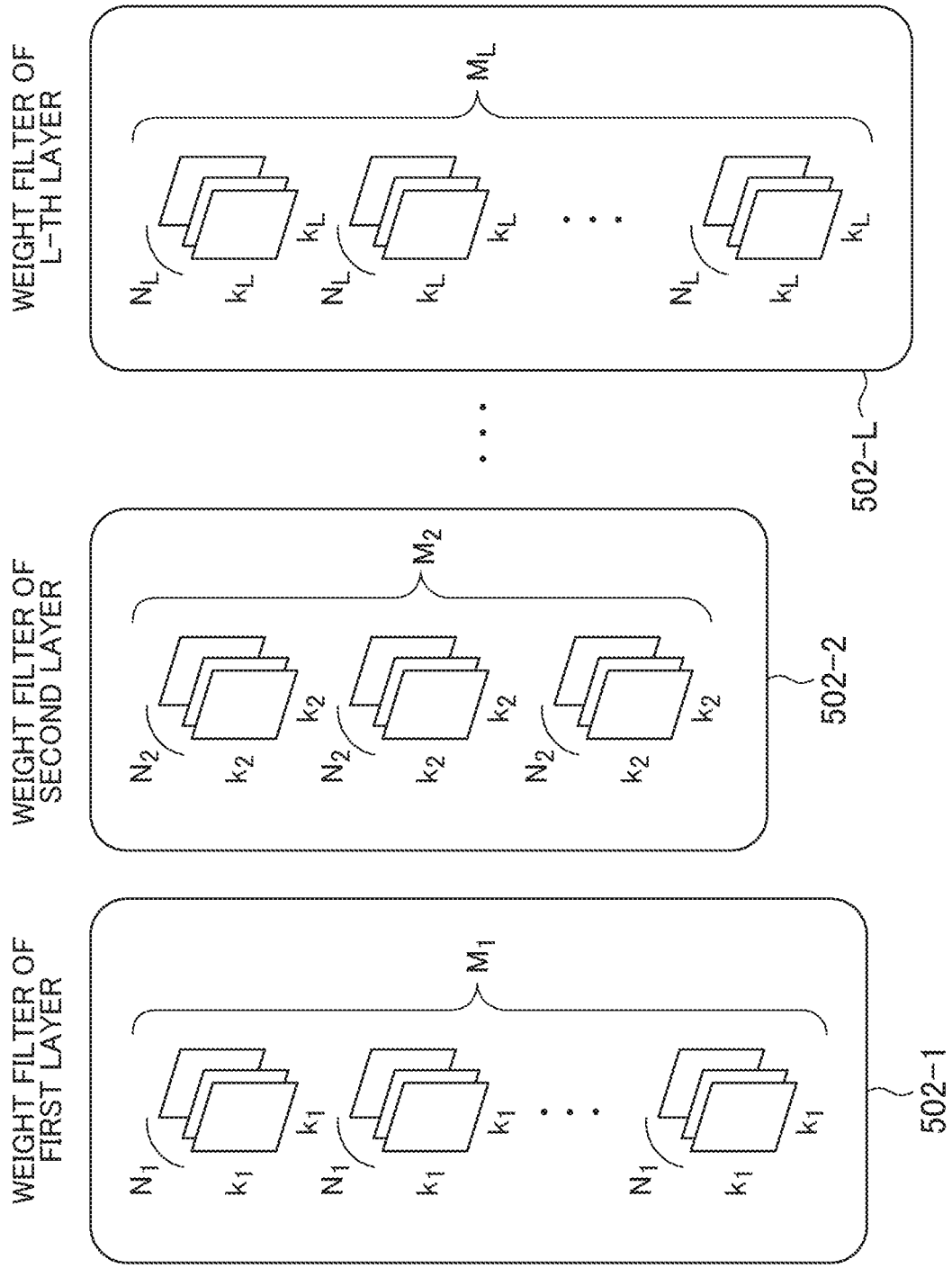

FIG. 7

| 701 LAYER NUMBER | 702 INPUT CH NUMBER | 703 OUTPUT CH NUMBER | 704 WEIGHT (VERTICAL) | 705 WEIGHT (HORIZONTAL) | 706 VALUE |
|---|---|---|---|---|---|
| 1 | 1 | 1 | 1 | 1 | $V(1,1,1,1,1)$ |
| | ⋮ | ⋮ | ⋮ | ⋮ | ⋮ |
| | $N_1$ | $M_1$ | $k_1$ | $k_1$ | $V(1,N_1,M_1,k_1,k_1)$ |
| 2 | 1 | 1 | 1 | 1 | $V(2,1,1,1,1)$ |
| | ⋮ | ⋮ | ⋮ | ⋮ | ⋮ |
| | $N_2$ | $M_2$ | $k_2$ | $k_2$ | $V(1,N_2,M_2,k_2,k_2)$ |
| ⋮ | 1 | 1 | 1 | 1 | $V(L,1,1,1,1)$ |
| | ⋮ | ⋮ | ⋮ | ⋮ | ⋮ |
| L | $N_L$ | $M_L$ | $k_L$ | $k_L$ | $V(1,N_L,M_L,k_L,k_L)$ |

LMi LEARNED MODEL

FIG. 11

| EDGE INFORMATION / EDGE NUMBER # | USE OF DNN (e1) | EDGE ENVIRONMENT (e2) | 3M INFORMATION (e3) | MAN INFORMATION (e4) | ... | TIME INFORMATION (ep) | MATCHED NUMBER (301) |
|---|---|---|---|---|---|---|---|
| 1 | 1 | 1 | 1 | 0 | ... | 1 | $h_1$ |
| 2 | 0 | 0 | 0 | 0 | ... | 0 | $h_2$ |
| ... | ... | ... | ... | ... | ... | ... | ... |
| i | 0 | 0 | 1 | 1 | ... | 0 | $h_i$ |
| ... | ... | ... | ... | ... | ... | ... | ... |
| n−1 | 0 | 0 | 0 | 0 | ... | 1 | $h_{n-1}$ |

FIG. 12

| EDGE INFORMATION / EDGE NUMBER # | e1 USE OF DNN | e2 EDGE ENVIRONMENT | e3 3M INFORMATION | e4 MAN INFORMATION | ... | ej ... | ... | ep TIME INFORMATION | WEIGHTED MATCHED NUMBER 1201 |
|---|---|---|---|---|---|---|---|---|---|
| 1 | 1 | 0 | 0 | 0 | ... | $x_{1j}$ | ... | 1 | $S_1 = \Sigma(w_j \times x_{1j})$ |
| 2 | 0 | 0 | 0 | 0 | ... | $x_{2j}$ | ... | 0 | $S_2 = \Sigma(w_j \times x_{2j})$ |
| ... | ... | ... | ... | ... | ... | ... | ... | ... | ... |
| i | 0 | 0 | 1 | 1 | ... | $x_{ij}$ | ... | 0 | $S_i = \Sigma(w_j \times x_{ij})$ |
| ... | ... | ... | ... | ... | ... | ... | ... | ... | ... |
| n−1 | 1 | 0 | 1 | 1 | ... | $x_{(n-1)j}$ | ... | 1 | $S_{n-1} = \Sigma(w_j \times x_{(n-1)j})$ |
|  | ↑ $w_1$ | ↑ $w_2$ | ↑ $w_3$ | ↑ $w_4$ |  | ↑ $w_j$ |  | ↑ $w_p$ |  |

FIG. 13A

| R1 | R2 | ... | Rn-1 |
|---|---|---|---|
| $S_1/\Sigma(S)$ | $S_2/\Sigma(S)$ | ... | $S_{n-1}/\Sigma(S)$ |

Cn — MODEL BLENDING CONDITION

FIG. 13B $$LM_n = \frac{LM_1 \times S_1/\Sigma(S) + LM_2 \times S_2/\Sigma(S) \cdots + LM_i \times S_i/\Sigma(S) \cdots + LM_{n-1} \times S_{n-1}/\Sigma(S)}{n-1}$$

FIG. 19

| EDGE INFORMATION / TIME | e1 USE OF DNN | e2 EDGE ENVIRONMENT | e3 3M INFORMATION | e4 MAN INFORMATION | ... | ep TIME INFORMATION | 301 MATCHED NUMBER |
|---|---|---|---|---|---|---|---|
| t1 | 1 | 1 | 0 | 0 | ... | 0 | $g_1$ |
| t2 | 1 | 1 | 0 | 0 | ... | 0 | $g_2$ |
| ... | ... | ... | ... | ... | ... | ... | ... |
| tj | 0 | 0 | 1 | 1 | ... | 0 | $g_j$ |
| ... | ... | ... | ... | ... | ... | ... | ... |
| tm−1 | 1 | 1 | 1 | 1 | ... | 1 | $g_{m-1}$ |

300(T1)

1800

| R1 | R2 | ... | Rn-1 |
|---|---|---|---|
| $g_1/\Sigma(g)$ | $g_2/\Sigma(g)$ | ... | $g_{m-1}/\Sigma(g)$ |

C1 MODEL BLENDING CONDITION $$LM1 = \frac{LM1(t1)1 \times g_1/\Sigma(g) + Lm1(t2) \times g_2/\Sigma(g) \cdots + Lm1(tj) \times g_i/\Sigma(g) \cdots + Lm1(tm-1) \times g_{n-1}/\Sigma(g)}{n-1}$$

MANAGEMENT DEVICE, MANAGEMENT METHOD, AND MANAGEMENT PROGRAM

CLAIM OF PRIORITY

The present application claims priority from Japanese patent application JP 2019-139086 filed on Jul. 29, 2019, the content of which is hereby incorporated by reference into this application.

BACKGROUND

The present invention relates to a management device which manages a target object to be managed, a management method, and a management program.

Conventionally, a learning inference system using a DNN (Deep Neural Network) requires a lot of datasets for learning. In the normal learning flow, a dataset acquired by an edge terminal is transferred to a cloud server. The cloud server generates a learned model in accordance with an edge environment in order to improve the accuracy, using the dataset.

As an example of the background art, for example, U.S. Patent Application Publication No. 2019-42955 discloses various systems and methods for starting and executing contextualized AI inferencing. In an example of the systems and methods, operations performed with a gateway computing device to invoke an inferencing model include receiving and processing a request for an inferencing operation, selecting an implementation of the inferencing model on a remote service based on a model specification and contextual data from the edge device, and executing the selected implementation of the inferencing model, such that results from the inferencing model are provided back to the edge device. Operations performed with an edge computing device to request an inferencing model include collecting contextual data, generating an inferencing request, transmitting the inference request to a gateway device, and receiving and processing the implementation results.

SUMMARY

However, in some edge terminals, transferring of datasets is difficult from the viewpoints of communication costs and rights for transferring the datasets. According to the conventional technique of U.S. Patent Application Publication No. 2019-42955, what is requested is a learned model which is managed by a data center being a cloud environment, based on the type of AI inferencing model, the sensor identifier, or specification of the edge device, in association with vehicles as environments of the edge device. However, it does not suggest generation of a learned model corresponding to a new edge environment.

An object of the present invention is to attain learning with high accuracy, while avoiding transferring of datasets from the edge terminal to the cloud server.

According to an aspect of the present invention disclosed in this application, there is provided a management device accessible to a target object to be managed, the device including:

a processor which executes a program; a storage device which stores the program; and a communication interface which can communicate with the target object to be managed, in which the processor executes a reception process for receiving first environmental information representing a first environment of the target object to be managed, a first generation process for generating relevant information representing relevancy between the first environmental information received by the reception process and second environmental information representing a second environment of the target object to be managed, a second generation process for generating a first learned model to be used for inference by the target object to be managed in the first environment, based on the relevant information generated by the first generating process and a second learned model to be used for inference by the target object to be managed in the second environment, and a transmission process for transmitting the first learned model generated by the second generation process to the target object to be managed.

According to the typical preferred embodiment of the present invention, it is possible to attain the learning with high accuracy, while avoiding transferring of datasets from the edge terminal to the cloud server. Those objects, configurations, and effects other than those described above will be apparent from the descriptions of the preferred embodiments as described below.

BRIEF DESCRIPTION OF THE DRAWINGS

FIG. 3 is an explanatory diagram illustrating an example of an explanatory diagram illustrating an example of a "matched number counting table" according to the first embodiment.

FIG. 5A, FIG. 5B, and FIG. 5C are explanatory diagrams illustrating examples of a neural network process which is present in one layer of a CNN.

FIG. 6 is an explanatory diagram illustrating an example of weight filters of the entire layers (L number of layers) of the CNN.

FIG. 7 is an explanatory diagram illustrating an example of a learned model including weight filter values of the entire layers of the CNN.

FIG. 11 is an explanatory diagram illustrating an example of a matched number counting table after updated.

FIG. 12 is an explanatory diagram illustrating an example of a matched number counting table according to a second embodiment.

FIG. 13A and FIG. 13B are explanatory diagrams respectively illustrating model blending conditions and a learned model, according to the second embodiment.

FIG. 19 is an explanatory diagram illustrating a matched number counting table in association with edge terminals.

DETAILED DESCRIPTION

First Embodiment

<Example of System Configuration of Management System>

Figure 1:
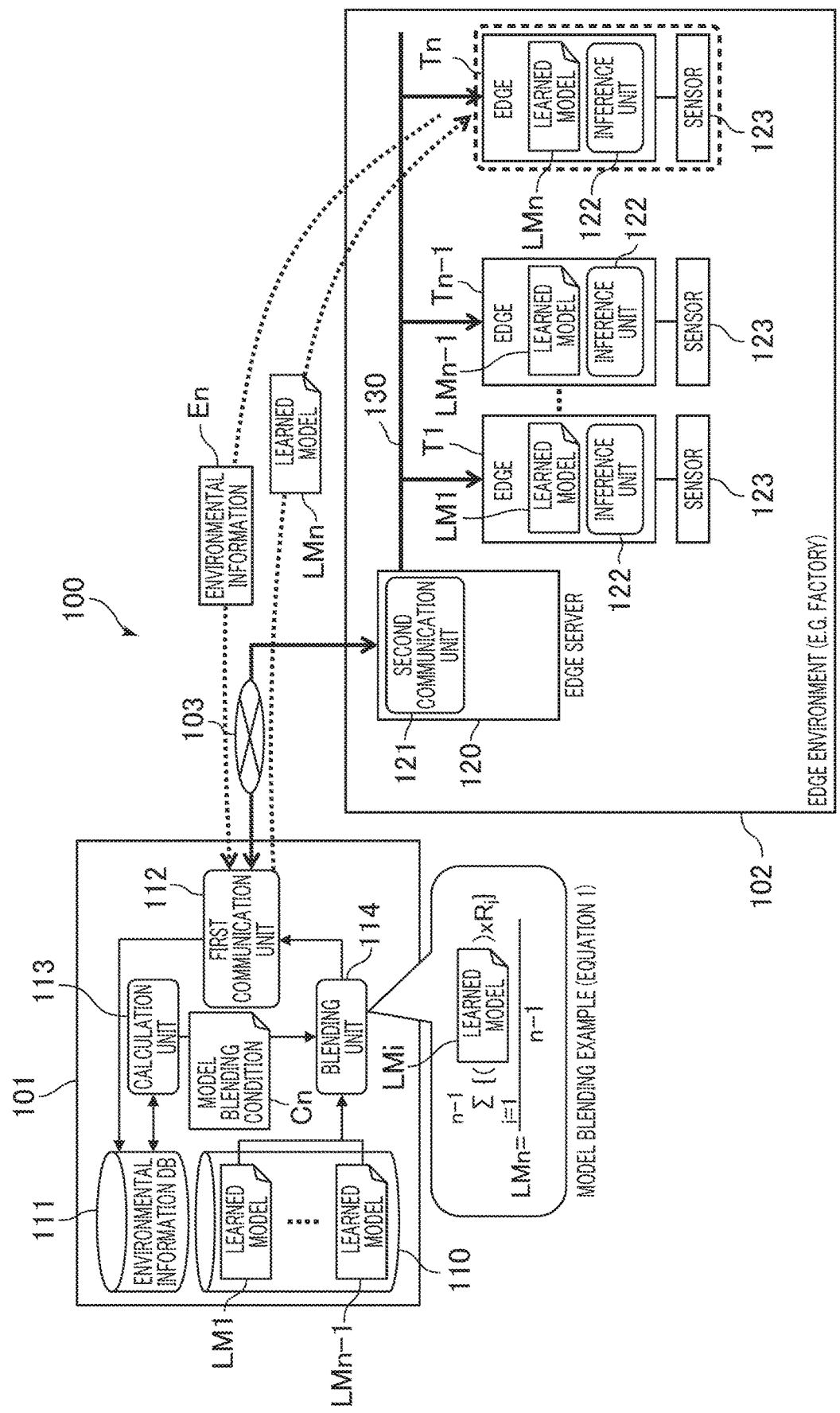
FIG. 1 is an explanatory diagram illustrating a system configuration example of a management system according to a first embodiment.

FIG. 1 is an explanatory diagram illustrating an example of a system configuration of a management system according to the first embodiment. The management system 100 has a management device 101 and an edge environment 102. The management device 101 and the edge environment 102 are connected and communicable with each other through a network 103 (regardless of wire/wireless), such as the Internet, a LAN (Local Area Network), a WAN (Wide Area Network), or the like. The management system 100 has only one edge environment 102, but may include a plurality of edge environments 102.

The management device 101 is a cloud environment. The edge environment 102 is a target to be managed by the management device 101, and is composed of an edge server and one or more edge terminals Ti ("i" is an integer satisfying 1≤i≤n). In FIG. 1, in the edge environment 102, "n−1" edge terminals T1 to Tn−1 are arranged, and an edge terminal Tn is newly added to the edge environment 102. The edge server is a gateway of the edge environment 102, and communicably connects the management device 101 and each of the edge terminals Ti.

In FIG. 1, the edge environment 102 is, for example, a factory, and the edge terminal Ti is a work machine, a robot, or a vehicle. The edge terminal Ti is not necessarily a mobile body. The edge environment 102 is not limited to a factory. For example, the edge environment 102 may be a warehouse in and from which commodities are warehoused/shipped. Functions of the edge server may be included in each of the edge terminals Ti.

The management device 101 generates a blend recipe from each environmental information of the edge terminals T1 to Tn−1, and blends the generated blend recipe with learned models LM1 to LMn, thereby generating the learned model LMn of the newly-added edge terminal Tn without executing a learning process for a dataset.

Specifically, for example, the management device 101 has a model DB 110, an environmental information DB 111, a first communication unit 112, a calculation unit 113, and a blending unit 114. The model DB 110 stores learned models LMi in association with each edge terminal Ti. The learned models LMi are weight parameters of the DNN that can be acquired by learning datasets for learning. However, because the management device 101 does not have datasets, it does not learn datasets. Thus, the learned model LMi is externally-prepared data.

The environmental information DB 111 stores environmental information, in association with the edge terminals Ti. Note that the environmental information represents the environment of the edge terminal Ti. The environment of the edge terminal Ti is the situation of the edge terminal Ti itself or its surrounding situation. It includes, for example, use of DNN implemented in the edge terminal Ti, an arrangement position of the edge terminal Ti, a type of the edge terminal Ti, a user operating the edge terminal Ti, the temperature inside or outside the edge terminal Ti, the behavior of the edge terminal Ti, and a work time zone of the edge terminal Ti. Apart of the environmental information is detected by a sensor 123, such as a camera or the like, connected to each edge terminal Ti. The environmental information DB will be described later in detail with reference to FIG. 2.

The first communication unit 112 receives environmental information En from the newly-added edge terminal Tn, sends the generated learned model LMn of the edge terminal Tn to the edge terminal Tn.

The calculation unit 113 calculates a model blending condition Cn with regard to the new edge terminal Tn. The model blending condition Cn is the above-described blend recipe. The model blending condition Cn is relevant information which is determined based on the relevancy between existing environmental information E1 to En (see FIG. 2) of the respective edge terminals T1 to Tn−1 and the environmental information En of the edge terminal Tn. In particular, the relevancy may be the matched number therebetween.

The blending unit 114 blends the model blending condition Cn with the existing learned models LM1 to LMn−1 to generate a learned model LMn of the edge terminal Tn. As the above-described matched number is large, parameters of the learned model LMn of the edge terminal Tn would be close to weight parameters of the existing learned models LM1 to LMn−1.

FIG. 1 illustrates an equation 1 as a model blending example. The left side of the equation represents the learned model LMn of the edge terminal Tn. The denominator on the right side of the equation represents the number of edge terminals T1 to Tn−1. A term Ri of the numerator on the right side thereof represents a weight based on the matched number between environmental information Ei of the existing edge terminal Ti and that of the edge terminal Tn, and would be one element of the model blending condition Cn. As the matched number is high, the weight becomes large, and its learned model LMi has a high degree of effect on the learned model LMn.

The edge server 120 has a second communication unit 121. The second communication unit 121 transfers environmental information En from the edge terminal Tn to the management device 101, and transfers the learned model LMn from the management device 101 to the edge terminal Tn.

The edge terminal Ti has the learned model LMi, an inference unit 122, and the sensor 123. The inference unit 122 is, for example, a convolutional neural network (CNN) as an example of the DNN. The inference unit 122 applies the learned model LMi to a CNN, inputs image data from a camera as the sensor 123 to the CNN, and outputs an inference result. The edge terminal Ti controls the behavior of the edge terminal Ti itself or any connected device, using the inference result.

In this manner, the management device 101 generates a model blending condition Cn as a blend recipe from the environmental information of the edge terminals T1 to Tn−1, blends the generated model blending condition Cn with the learned models LM1 to LMn−1, thereby generating the learned model LMn of the newly-added edge terminal Tn without executing learning of datasets.

The edge terminal Tn executes inference using the learned model LMn. Then, the edge terminal Tn does not need to upload a dataset to the management device 101, thus not incurring excess communication cost for transferring the dataset. Because there is no need to upload the dataset to the management device 101, leakage of the dataset is prevented. The management device 101 does not need to implement a learning function using the dataset, thus attaining a reduction in calculation load.

<Environmental Information DB 111>

Figure 2:
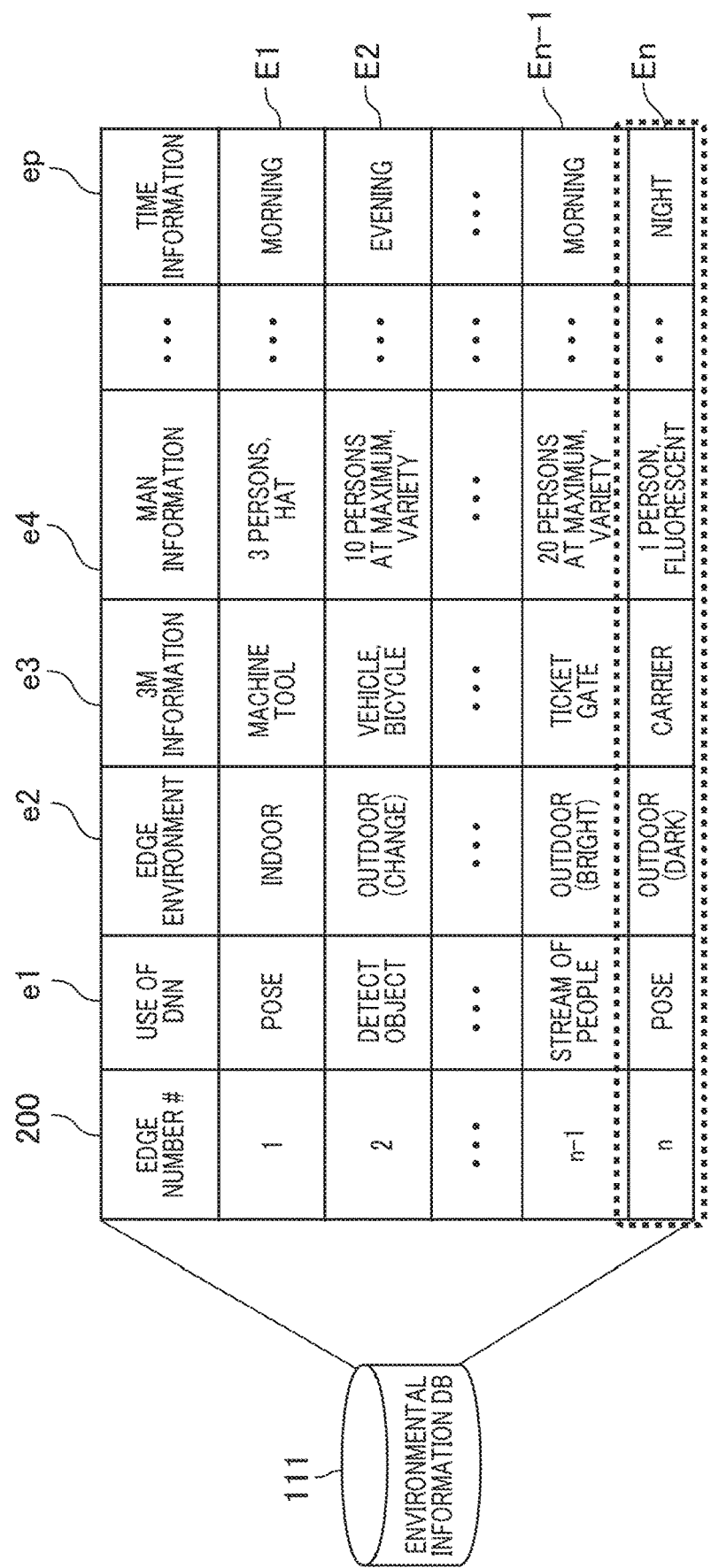
FIG. 2 is an explanatory diagram illustrating an example of an environmental information DB illustrated in FIG. 1.

FIG. 2 is an explanatory diagram illustrating an example of the environmental information DB 111 illustrated in FIG. 1. The environmental information DB 111 has a p-number (p is an integer of 1 or higher) of edge information items e1 to ep in association with edge numbers 200. For example, the edge information items e includes items of, for example, a use of DNN e1, an edge environment e2, 3M information e3, Man information e4, . . . , and time information ep, as environmental items. A combination of edge information items in one row is the environmental information Ei of an edge terminal Ti specified by its corresponding edge number 200.

The "3M information" e3 includes at least one of three items of "machine", "method", and "material". The "Man information" e4 represents the user of the edge terminal Ti (for example, the number, physical appearance, or sex of users). In this embodiment, the environmental information E1 to En−1 are stored in the environmental information DB 111. The edge terminal Tn is added to the edge environment 102, and the management device 101 receives environmental information En from the edge terminal Tn. This is a state in which the environmental information En is additionally registered.

<Matched Number Counting Table>

FIG. 3 is an explanatory diagram illustrating an example of a matched number counting table according to the first embodiment. The matched number counting table 300 counts a matched number 301 of edge information between the existing environmental information Ei and the environmental information En of the new edge terminal Ti. When edge information items are matched respectively between the existing environmental information Ei and the environmental information En of the new edge terminal Ti, a value of "1" is defined. When the information items are not matched therebetween, a value of "0" is defined. The total value in the row direction represents a matched number hi with respect to the environmental information Ei.

<Model Blending Condition and Learned Model>

Figures 4A, 4B:
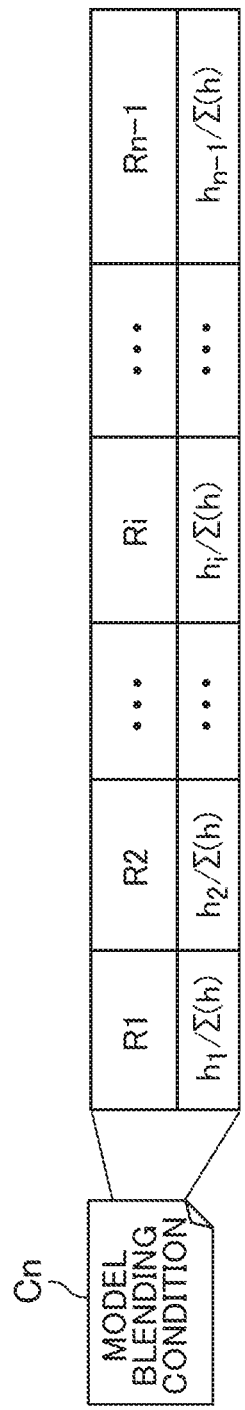
FIG. 4A and FIG. 4B are explanatory diagrams illustrating respectively a model blending condition and a learned model, according to the first embodiment.

FIG. 4A and FIG. 4B are explanatory diagrams illustrating respectively a model blending condition and a learned model, according to the first embodiment. FIG. 4A illustrates the model blending condition Cn of the edge terminal Tn, while FIG. 4B illustrates an example of an equation for the learned model LMn. The model blending condition Cn is a combination of weights R1 to Rn−1. The denominator Σ(h) of the weight Ri is the total sum of matched numbers h1 to hn−1. In the equation of 4B, the model blending condition Cn is substituted in "Ri" of Equation 1 of FIG. 1.

<Learned Model LMi>

FIG. 5 are explanatory diagrams respectively illustrating examples of a neural network process is present in one layer of the CNN. FIG. 5A illustrates an input characteristic map 501, FIG. 5B illustrates a weight filter 502, and FIG. 5C illustrates an output characteristic map 503. The output characteristic map 503 is a multiplication result of the input characteristic map 501 and the weight filter 502, and is the input characteristic map 501 of the next layer.

The input characteristic map 501 is composed of a matrix of an N-number of H*W rows and columns, where N is the number of input channels. For example, when the input characteristic map 501 is composed of rows and columns derived from image data, the number N of input channels is 3, that is, R (red), G (green), and B (blue). "H" represents the height of the input characteristic map 501 (the number of elements in column direction), while "W" represents the width of the input characteristic map 501 (the number of elements in row direction).

The weight filter 502 is a matrix of k*k. The weight filter 502 is composed of a matrix of N-number which is the number of input channels. The input characteristic map 501 is raster scanned by the weight filter 502 in association with the input channels, thereby obtaining the output characteristic map 503 in association with the input channels. "H'" represents the height of the output characteristic map 503 (the number of elements in the column direction), while "W'" represents the width of the output characteristic map 503 (the number of elements in the row direction).

FIG. 6 is an explanatory diagram illustrating an example of the weight filter 502 of the entire layers (the number of Layers L). The weight filter 502 of the first layer is composed of a matrix of $k_1*k_1$ corresponding to the number $N_1$ of input channels. "$M_1$" represents the output channel number. The weight filter 502-2 of the second layer is composed of a matrix of $k_2*k_2$ corresponding to the number $N_2$ of the input channels. "$M_2$" represents the output channel number. The weight filter 502-L of the L-th layer is composed of a matrix of $k_L*k_L$ corresponding to the number $N_L$ of the input channels. "$M_L$" represents the output channel number.

FIG. 7 is an explanatory diagram illustrating an example of the learned model LMi with values of the weight filter 502 of the entire layers (L-number of layers) of the CNN. A value 706 includes a one-dimensional vector of a layer number 701, an input channel number 702, an output channel number 703, and a weight (vertical) 705. The matrix (weight filter 502) having the entire one-dimensional vectors arranged in the column direction is the learned model LMi.

<Example Hardware Configuration of Computer>

Descriptions will now be made to an example of the hardware configuration of the computer. The computer may be any of the management device 101, the edge server 120, and the edge terminal Ti, which are illustrated in FIG. 1.

Figure 8:
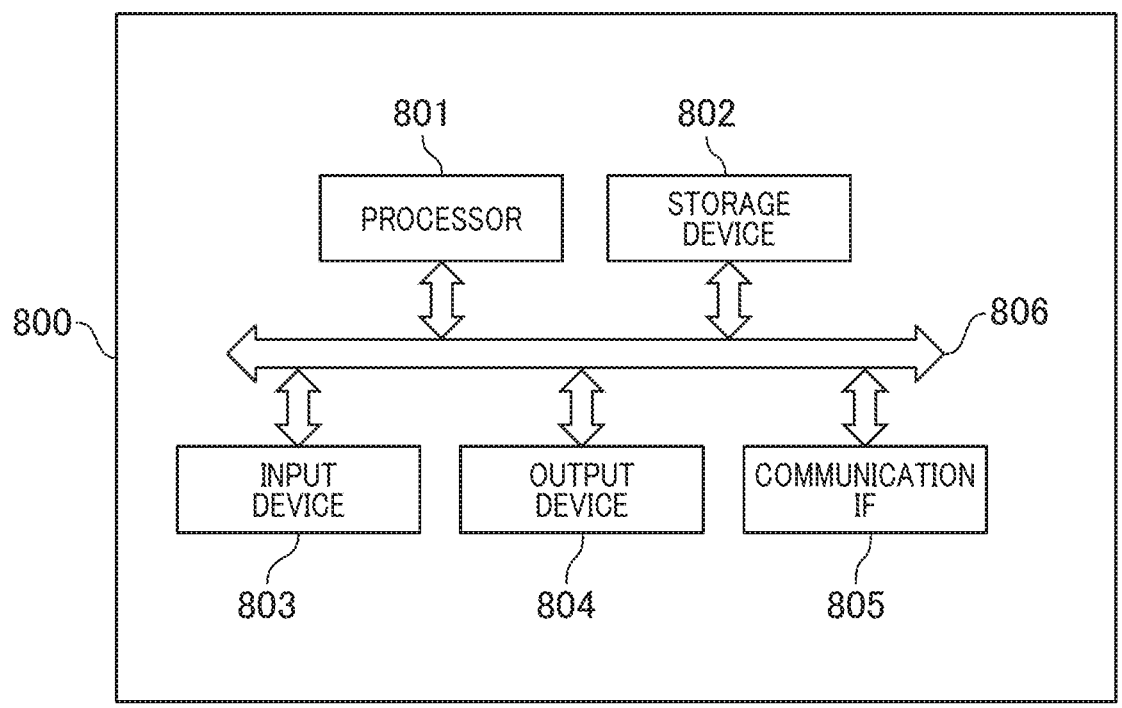
FIG. 8 is a block diagram illustrating an example of a hardware configuration of a computer.

FIG. 8 is a block diagram illustrating an example of a hardware configuration of the computer. The computer 800 has a processor 801, a storage device 802, an input device 803, an output device 804, and a communication interface (communication IF) 805. The processor 801, the storage device 802, the input device 803, the output device 804, and the communication IF 805 are connected with each other through a bus 806.

The processor 801 controls the computer 800. The processor 801 includes a CPU (Central Processing Unit) and a GPU (Graphics Processing Unit). The storage device 802 is a work area of the processor 801. The storage device 802 is a non-temporary or temporary storage medium which stores various programs or data. The storage device 802 may be any of a ROM (Read Only Memory), for example, a RAM (Random Access Memory), a HDD (Hard Disk Drive), and a flash memory.

The input device 803 inputs data. The input device 803 may be any of a keyboard, for example, a mouse, a touch panel, a ten-keyboard, and a scanner. The output device 804 outputs data. For example, the output device 804 may be any of a display and a printer. The communication IF 805 is connected to the network 103 to transmit and receive data.

In the management device 101, the first communication unit 112, the calculation unit 113, and the blending unit 114 are realized by controlling the processor 801 to execute the programs stored, for example, in the storage device 802. The model DB 110 and the environmental information DB 111 are realized, for example, by the storage device 802 illustrated in FIG. 8. In the edge server 120, the second communication unit 121 is realized by controlling the processor 801 to execute the programs stored, for example, in the storage device 802. In the edge terminal Tn, the inference unit 122 is realized by controlling the processor 801 to execute the programs stored, for example, in the storage device 802.

<Example of Sequence of Management System 100>

Figure 9:
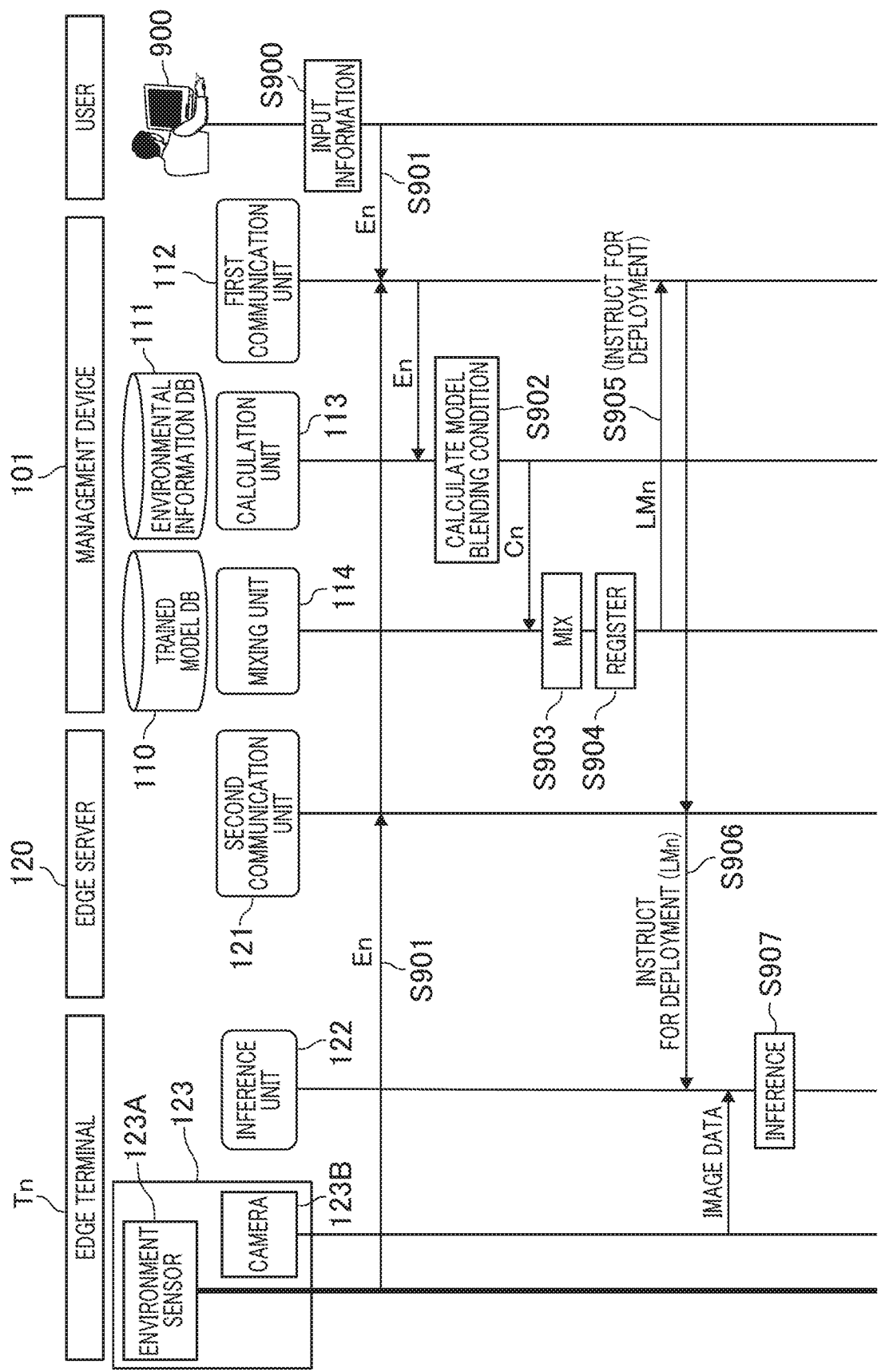
FIG. 9 is a sequence diagram illustrating a sequence example of a management system according to the first embodiment.

FIG. 9 is a sequence diagram illustrating a sequence example of the management system 100 according to the first embodiment. The edge terminal Tn detects the environmental information En from the sensor 123, such as a temperature sensor, an environment sensor 123A, a camera 123B, or the like. The terminal Tn transmits the environmental information En to the first communication unit 112 of the management device 101, through the second communication unit 121 of the edge server 120 (Step S901). Note that the user of the management device 101 inputs the environmental information En from a management terminal 900 (Step S900), thereby transmitting it to the first communication unit 112 of the management device 101 (Step S901). The first communication unit 112 outputs the received environmental information En to the calculation unit 113.

The calculation unit 113 calculates the model blending condition Cn, and outputs it to the blending unit 114 (Step S902). The blending unit 114 mixes the model blending condition Cn with the existing learned models LM1 to LMn−1, to generate the learned model LMn of the edge terminal Tn (Step S903). The blending unit 114 registers the generated learned model LMn in the model DB 110 (Step S904). When a new learned model LMn+1 is generated, the learned model LMn is handled as an existing learned model LMi.

The blending unit 114 outputs a deploy instruction including the learned model LMn to the first communication unit 112 (Step S905). The first communication unit 112 transmits the deploy instruction to the edge terminal Tn through the second communication unit 121 of the edge server 120 (S906). Upon reception of the deploy instruction, the edge terminal Tn applies the learned model LMn to the CNN of the inference unit 122. When image data is input from the camera 123B to the CNN, the inference unit 122 outputs the inference result (Step S907). Then, the terminal Tn controls, as a terminal Ti, the behavior of the edge terminal Ti itself or other connected devices using the inference result.

In this manner, the management device 101 generates a model blending condition Cn as a blend recipe from each environmental information of the edge terminals T1 to Tn−1, and blends the generated model blending condition Cn with the learned model LM1 to LMn−1. By so doing, it is possible to generate the learned model LMn of the newly-added edge terminal Tn, without executing learning of datasets.

The edge terminal Tn executes inference using the learned model LMn. Hence, the edge terminal Tn does not need to upload the dataset to the management device 101. Thus, it requires no communication cost in transferring the dataset. Besides, there is no need to upload the dataset to the management device 101, thus preventing leakage of the dataset. The management device 101 does not need to implement the learning function using the dataset, thus attaining a reduction in calculation load.

In the first embodiment, the descriptions have been made to the case where the edge terminal Tn is newly added to the edge environment 102. The blending may be performed in the same manner as that for newly adding the edge terminal Tn, even when updating the environmental information Ei of the existing edge terminal Ti.

Figure 10:
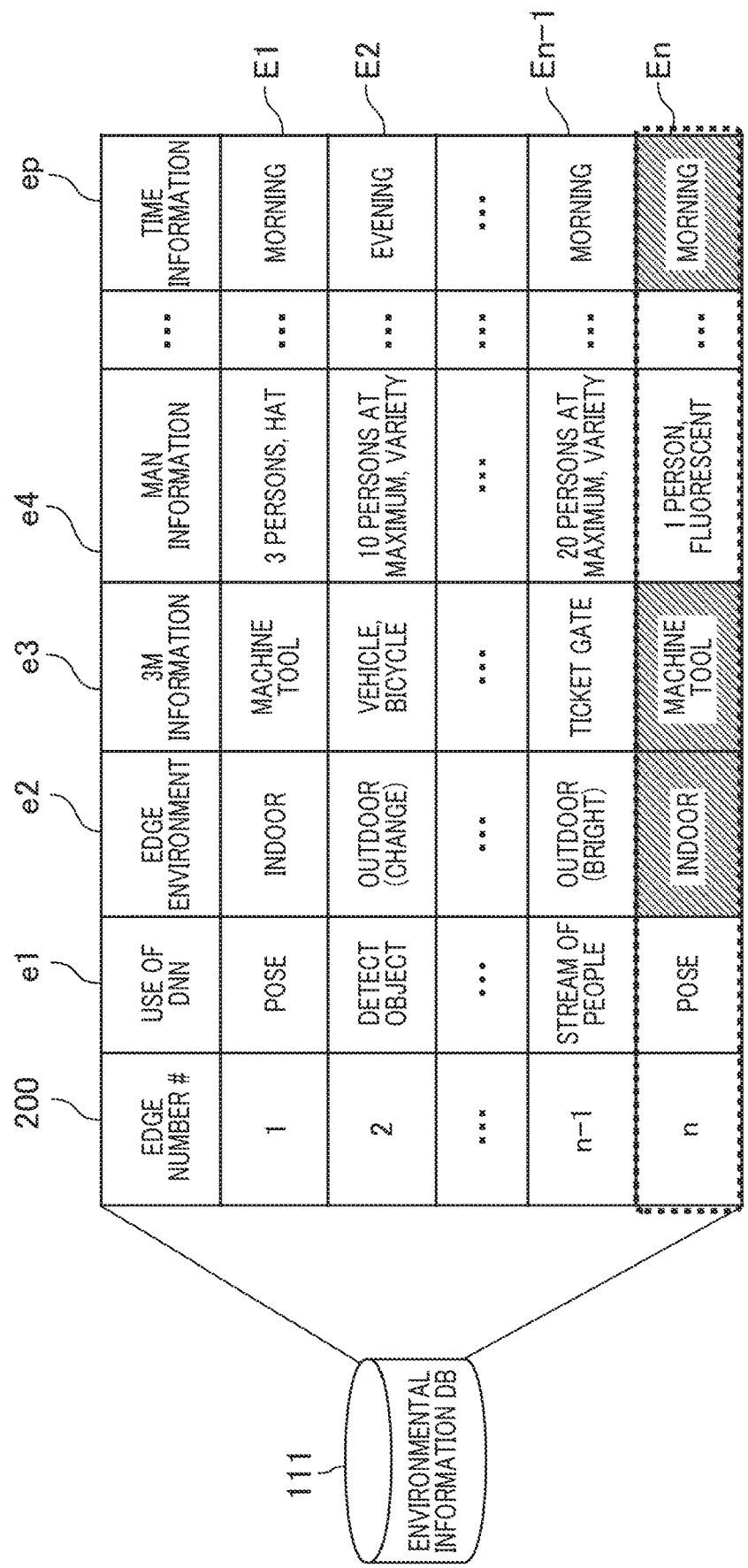
FIG. 10 is an explanatory diagram illustrating an example of an environmental information DB after updated.

FIG. 10 is an explanatory diagram illustrating an example of the environmental information DB 111 after updated. FIG. 10 illustrates a state in which the edge information e2, the 3M information e3, and the time information ep of the environmental information En have been updated.

FIG. 11 is an explanatory diagram illustrating an example of the matched number counting table 300 after updated. FIG. 11 illustrates a state in which the edge environment e2, the 3M information e3, and the time information ep in relation with the edge number (#1) have been updated to "1", and in which the time information ep in relation with the edge number (#n−1) has been updated to "1", based on the environmental information En after updated as illustrated in FIG. 10.

In this manner, for example, even when the environmental information En of the edge terminal Tn has been updated, the management device 101 generates a new learned model LMn in the same manner as that for newly adding the environmental information En, to update the model DB 110. The same applies to a case where any other environmental information E1 to En−1 has been updated.

Assumed is a case where the edge terminal T3 is removed from the edge environment 102. In this case, the management device 101 deletes the learned model LM3 from the model DB 110. The management device 101 may use the learned models LM1, LM2, LM4 to LMn as they are. The management device 101 may update the learned models LM4 to LMn whose edge number #(i) is greater than 3, in order to eliminate the effect of the edge terminal T3.

For example, the management device 101 may control the calculation unit 113 to calculate the matching degree of the environmental information E4 with other environmental information E1, E2, E5 to En, and may control the blending unit 114 to generate a new learned model LM4. The same applies to the environmental information E5 to En.

As a result, like the above-described new adding steps, the management device 101 can update the learned model LMi without executing learning of the datasets. The edge terminal Ti executes inference using the learned model LMi after updated. Hence, the edge terminal Ti does not need to upload the dataset to the management device 101. Thus, it requires no communication cost in transferring the dataset. Besides, there is no need to upload the dataset to the management device 101, thus preventing leakage of dataset. The management device 101 does not need to implement the learning function using the dataset, thus attaining a reduction in calculation load.

Second Embodiment

Descriptions will now be made to a second embodiment. The second embodiment introduces an example in which the matching degree is weighted in accordance with the edge information. Hereinafter, because the second embodiment will mainly be described, those parts that are common to those of the first embodiment are identified by the same reference numerals, and thus will not be described over and over.

<Matched Number Counting Table>

FIG. 12 is an explanatory diagram illustrating an example of the matched number counting table according to the second embodiment. In a matched number counting table 1200 of the second embodiment, what differs from the matched number counting table 300 of the first embodiment is that an intrinsic weight coefficient wj is given to each edge information ej ($1 \leq j \leq p$), and the matched number 301 is changed to a weighted matched number 1001. The weight coefficient wj has been set in advance. The weight coefficient wj is an integer of, for example, 0 or higher. When weight coefficients w1 to wp are all 1, the matched number counting table 1200 is the same as the matched number counting table 300 of the first embodiment.

It is assumed that a value "xij" (1 or 0) represents matching or non-matching of edge information ej in the edge terminal Ti in relation with the edge number i. The weighted matched number Si is expressed as $Si=\Sigma(wj*xij)$. That is, only when "xij" is 1, the weight coefficient wj is reflected on the weighted matched number Si.

<Model Blending Condition and Learned Model>

FIG. 13 are explanatory diagrams illustrating the model blending condition and the learned model, according to the second embodiment. FIG. 13A illustrates the model blending condition Cn, while FIG. 13B illustrates an example of an equation of the learned model LMn. The model blending condition Cn is a combination of weights R1 to Rn−1. The denominator $\Sigma(S)$ of the weight Ri is the total sum of matched numbers S1 to Sn−1. In the equation of 13B, the model blending condition Cn is substituted in "Ri" of Equation 1 of FIG. 1.

According to the second embodiment, the edge information ej is weighted with a weight coefficient wj, thereby generating a learned model LMn of the edge terminal Tn which has been customized for various edge environments 102.

Third Embodiment

Descriptions will now be made to a third embodiment. The edge server 120 of the first and the second embodiments has been assumed as a communication device which functions as a gateway of the edge environment 102. However, in the third embodiment, learning is executed using a dataset from the edge terminal Ti to generate a learned model LMi as a learning result. Hereinafter, because the third embodiment will mainly be described, those parts that are common to those of the first and the second embodiments are identified by the same reference numerals, and thus will not be described over and over.

<System Configuration Example of Management System 100>

Figure 14:
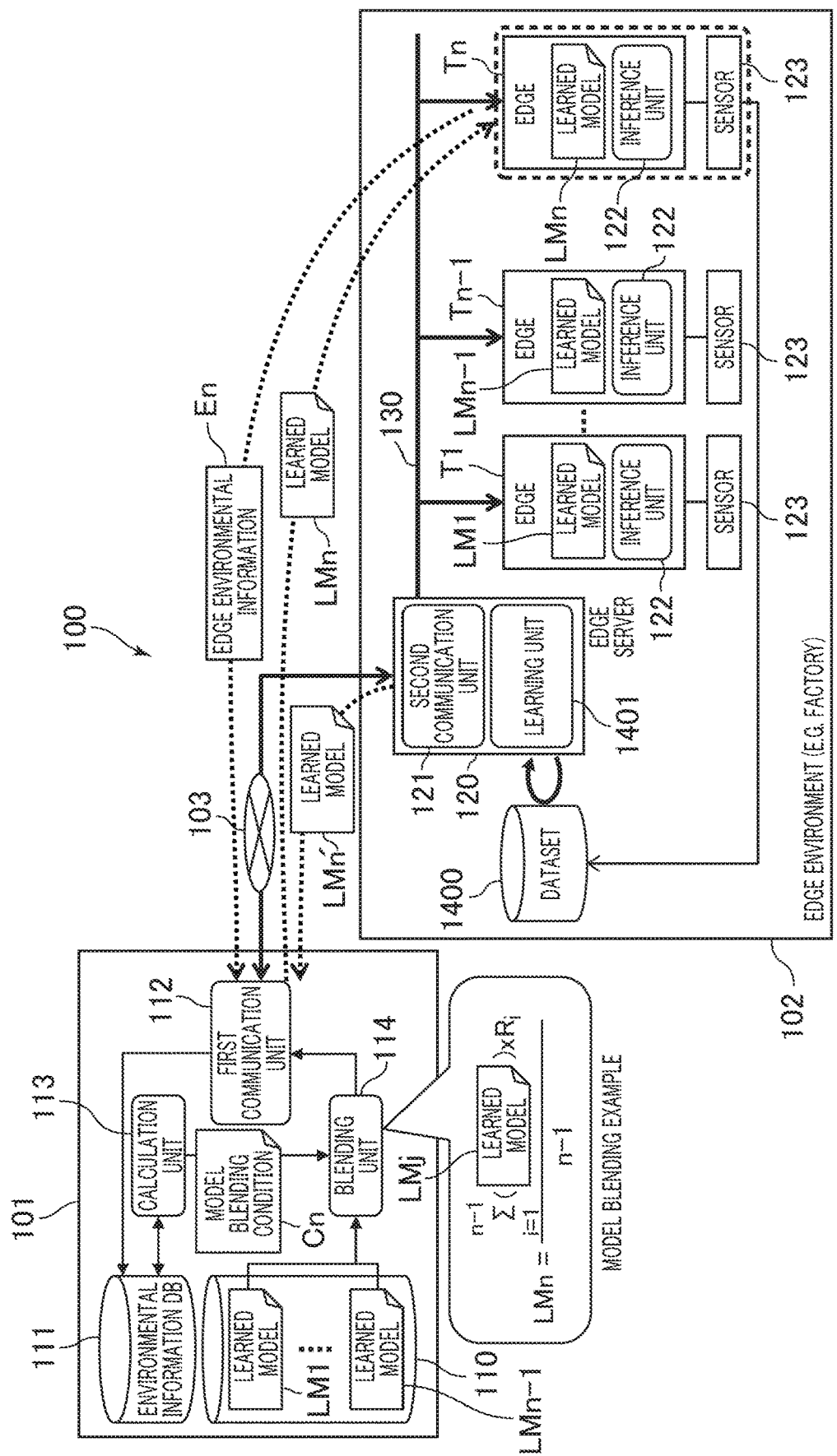
FIG. 14 is an explanatory diagram illustrating an example of a system configuration of a management system according to a third embodiment.

FIG. 14 is an explanatory diagram illustrating a system configuration example of the management system 100 according to the third embodiment. The edge server 120 has a learning unit 1401. Specifically, the learning unit 1401 is realized by controlling, for example, the processor 801 to execute the programs stored in the storage device 802. The learning unit 1401 is composed of a CNN having the same configuration as that of the inference unit 122.

<Sequence Example of Management System 100>

Figure 15:
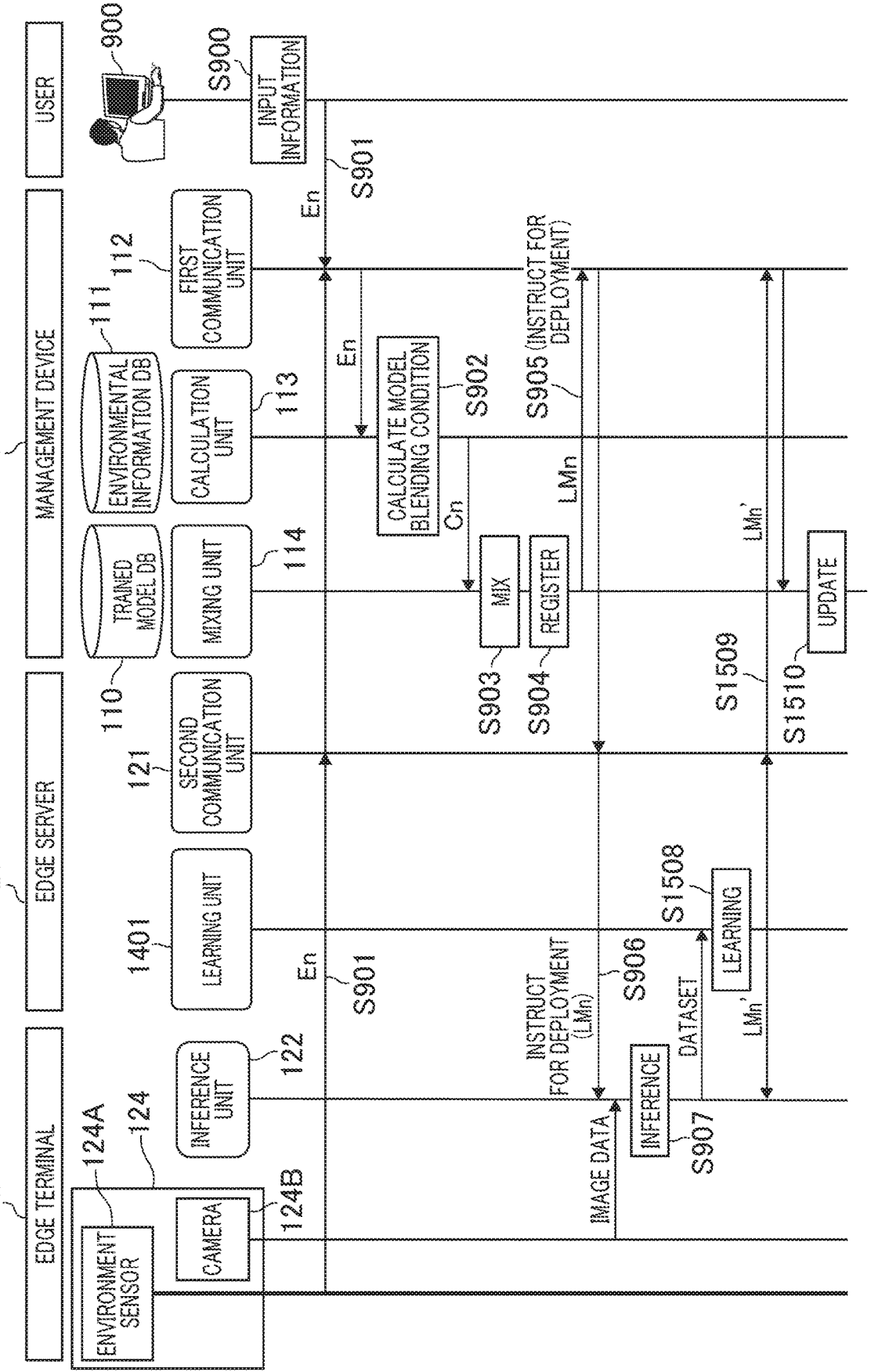
FIG. 15 is a sequence diagram illustrating a sequence example of the management system according to the third embodiment.

FIG. 15 is a sequence diagram illustrating a sequence example of the management system 100 according to the third embodiment. Upon reception of a learned model LMn from the management device 101 (Step S906), one edge terminal (referred to as an edge terminal Tn) applies it to the inference unit 122, and inputs image data from the sensor 123, thereby outputting an inference result (Step S907). When the inference result is incorrect, the user of the edge terminal Tn allocates correct data to the inference result to set datasets. The learning unit 1401 provides the CNN with the dataset which has been set to the user of the edge terminal Tn, to generate a learned model LMn' (Step S1508).

The learning unit 1401 outputs the learned model LMn' to the inference unit 122, and also transmits it from the second communication unit 121 to the first communication unit 112 of the management device 101 (Step S1509). By outputting the learned model to the inference unit 122, the edge terminal Tn can execute inference without waiting for the learned model LMn' from the management device 101.

The management device 101 outputs the learned model LMn' to the blending unit 114. The blending unit 114 updates the learned model LMn in the model DB 110 to the learned model LMn' (Step S1510). Then, the management device 101 can apply the learned model LMn' into the mixing by the blending unit 114.

Figure 16:
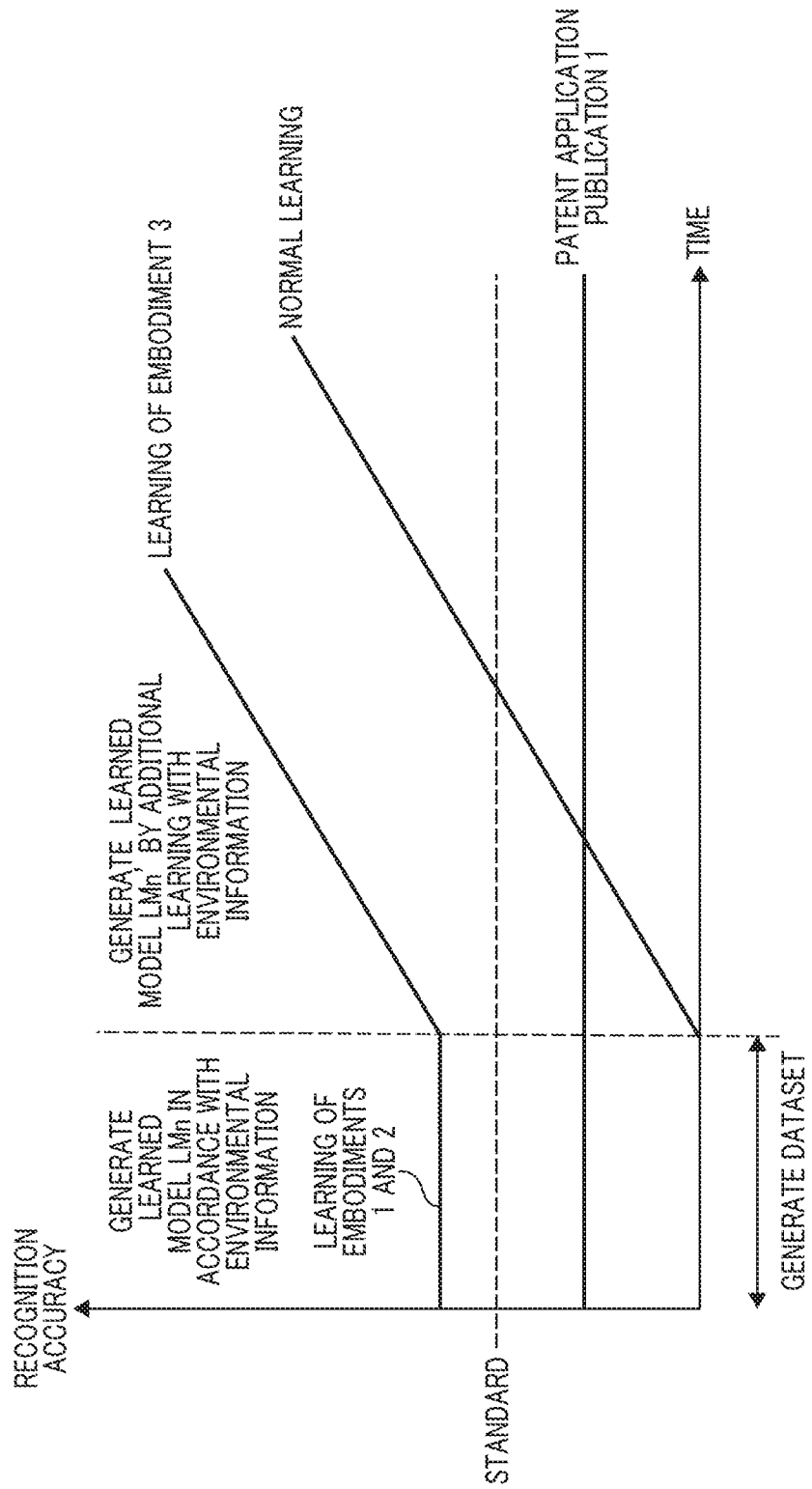
FIG. 16 is a graph illustrating the transition of recognition accuracy of the CNN.

FIG. 16 is a graph illustrating the transition of recognition accuracy of the CNN. As compared with U.S. Patent Application Publication No. 2019-42955, a higher recognition accuracy is attained in the CNN into which the new learned model LMn has been applied, according to the first and the second embodiments. Applying the third embodiment can attain a further higher recognition accuracy in the CNN into which the new learned model LMn' has been applied in the third embodiment, than those of the first and second embodiments, after passage of a time for preparing a dataset.

According to the third embodiment, it is possible to attain a high accuracy of the learned model LMn'. By executing learning with the edger server 120 instead of the management device 101, it is possible to prevent uploading of the dataset to the management device 101. This requires no communication cost in transferring the dataset. Besides, there is no need to upload the dataset to the management device 101, thus preventing leakage of the dataset. The management device 101 does not need to implement the learning function using the dataset, thus attaining a reduction in calculation load.

Fourth Embodiment

Descriptions will now be made to a fourth embodiment. In the first to the third embodiments, the descriptions have been made to the example in which the management device 101 generates the learned model LMi without using a dataset, by increasing/decreasing the number of edge terminals Ti. In this fourth embodiment, contrarily, descriptions will now be made to an example of generating a latest learned model LMi, when the environmental information Ei of the edge terminal Ti is present in the time direction. Hereinafter, because the fourth embodiment will mainly be described, those parts that are common to those of the first to the third embodiments are identified by the same reference numerals, and thus will not be described over and over.

<Learned Model LMi>

Figure 17:
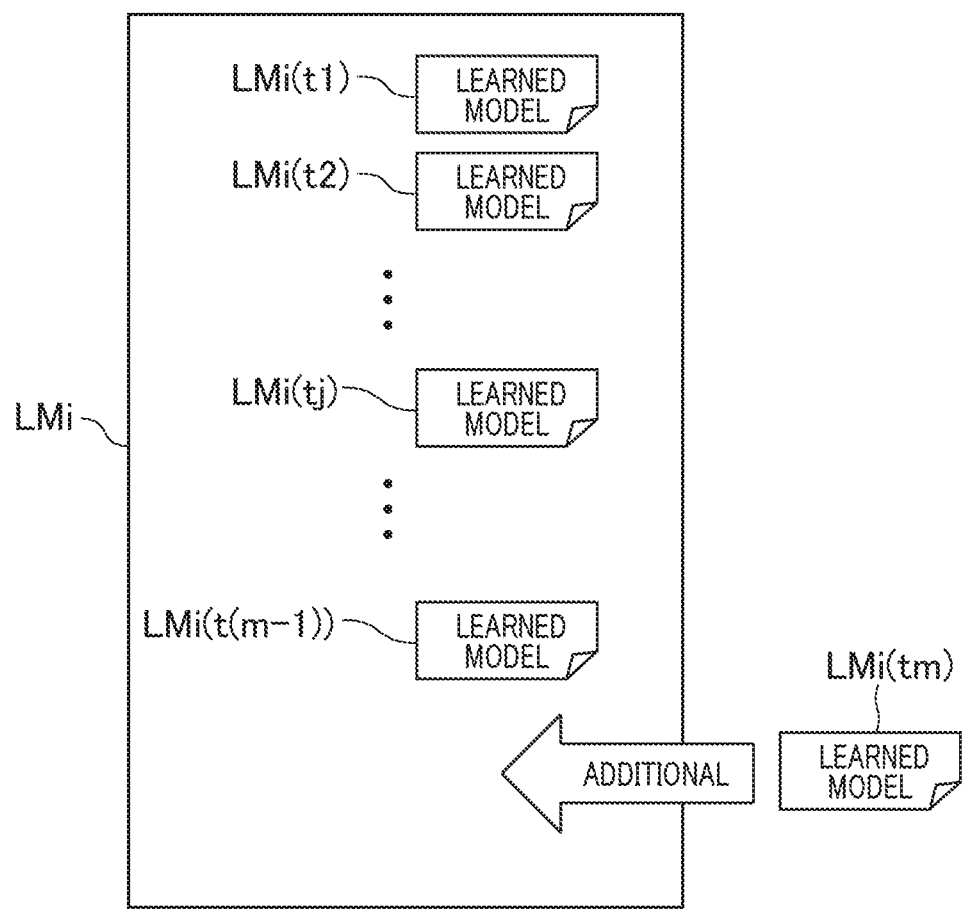
FIG. 17 is an explanatory diagram illustrating examples of learned models stored in a model DB.

FIG. 17 is an explanatory diagram illustrating an example of the learned models LMi stored in the model DB 110. The learned models LMi include learned models LMi(t1), LMi(t2), . . . , LMi(tj), . . . , and LMi(t(m−1)). Those symbols t1 to t(m−1) represent timesteps indicating the time. The smaller the "j", the older the time. The learned model LMi(tm) is a learned model which is newly added based on the environmental information Em of the time tm.

<Environmental Information DB 111>

Figure 18:
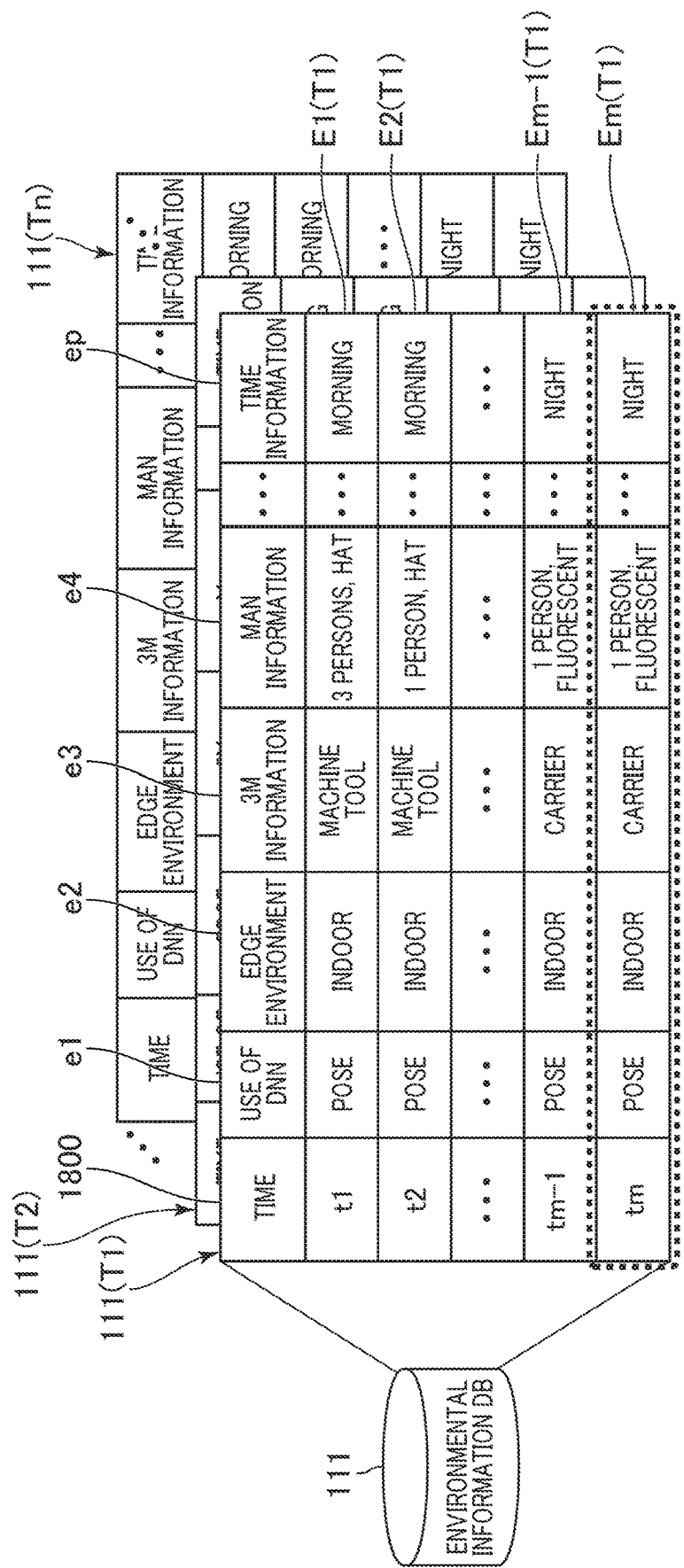
FIG. 18 is an explanatory illustrating an example of an environmental information DB according to a fourth embodiment.

FIG. 18 is an explanatory diagram illustrating an example of the environmental information DB 111 according to the fourth embodiment. The environmental information DB 111 stores an environmental information table 111 (Ti) in association with edge terminals Ti. The environmental information table 111 (Ti) stores the environmental information E1 (Ti) in association with time 1800.

<Matched Number Counting Table>

FIG. 19 is an explanatory diagram illustrating an example of a matched number counting table with regard to the edge terminal Ti. FIG. 19 illustrates, as an example, a matched number counting table 300 (T1) regarding the edge terminal T1 whose edge number (#) is 1 (i=1). In FIG. 3, values of the edge information items e1 to ep are given in association with the edge numbers 200. On the other hand, in FIG. 19, values of the edge information items e1 to ep are given in association with the time 1800. Like the second embodiment, the weight coefficients w1 to wp may be applied thereto.

A value "1" represents that the edge information items are matched between the existing environmental information E1($tj$) and the environmental information E1($tm$) of the new edge terminal T1, while a value "0" represents that they are not matched. The total value in the row direction represents the matched number gj with respect to the environmental information E1($tj$).

<Model Blending Condition and Learned Model>

Figures 20A, 20B:
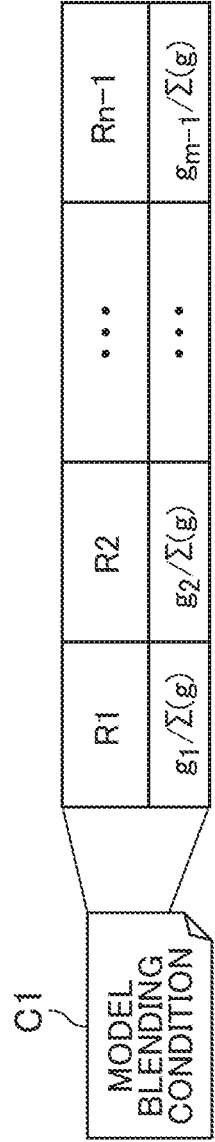
FIG. 20A and FIG. 20B are explanatory diagrams illustrating a model blending condition and a learned model, according to the fourth embodiment.

FIG. 20 are explanatory diagrams illustrating a model blending condition and a learned model, according to the fourth embodiment. FIG. 20A illustrates the model blending condition of an edge terminal T1 whose edge number (#) is 1 (i=1), while FIG. 20B illustrates an example of an equation of the learned model LM1. The model blending condition Cl is a combination of weights R1 to Rn−1. The denominator $\Sigma(g)$ of the weight Ri is the total sum of matched numbers g1 to gm−1. In the equation of 20B, the model blending condition Cl is substituted in "Ri" of Equation 1 of FIG. 1.

In this manner, the management device 101 generates a model blending condition Ci which is a blend recipe from the environmental information Ei(T1) to Ei(t(m−1)) in the time direction of the edge terminal Ti, and blends the generated model blending condition Ci with the learned models LMi(T1) to LMi(t(m−1)). By so doing, it generates the learned model LMi(tm) of the edge terminal Ti into which environmental information Ei(tm) is newly added, without executing learning of the dataset.

The edge terminal Ti executes inference using the learned model LMi(tm). As a result, the edge terminal Ti does not need to upload the dataset to the management device 101. Thus, it requires not communication cost in transferring the dataset. Because there is no need to upload the dataset to the management device 101, it is possible to prevent leakage of the dataset. Because the management device 101 does not need to implement the learning function using the dataset, it is possible to attain a reduction in calculation load.

The present invention is not limited to the above-described embodiments, but rather includes various modifications and equivalent configurations within the meaning of the scope of the attached claims. For example, the above-described embodiments have been described in detail for easy understanding of the present invention. It is not necessarily needed that the present invention includes the above-described entire configurations. The configuration of one embodiment may partially be replaced by any of the rest of embodiments, or the configuration of one embodiment may be added to any of the rest of embodiments. The configuration of each of the embodiments may partially be added to, deleted from, or replaced by other configurations.

The above-described configurations, functions, processing units, and processing means may partially or entirely be realized with the hardware, by designing it using, for example, an integrated circuit. Alternatively, they may be realized with the software, controlling the processor to analyze and execute the programs realizing the functions.

Information of the programs, tables, and files for realizing the functions may be stored in a storage device, such as a memory, a hard disk, and an SSD (Solid State Drive), or may be stored on a recording medium, such as an IC (Integrated Circuit) card, an SD card, and a DVD (Digital Versatile Disc).

Only those control lines and the information lines that are considered necessary for the descriptions have been illustrated. Thus, all control lines and information lines necessary for the implementation are not illustrated. In fact, it can be assumed that nearly all configurations are connected with each other.

What is claimed is:

1. A management device accessible to a target object to be managed, the management device comprising:
    a processor which executes a program;
    a storage device which stores the program; and
    a communication interface which is configured to communicate with the target object to be managed,
    wherein the processor executes:
        a reception process for receiving first environmental information representing a first environment of the target object to be managed;
        a first generation process for generating relevant information representing relevancy between the first environmental information received by the reception process and second environmental information representing a second environment of the target object to be managed;
        a second generation process for generating a first learned model to be used for inference by the target object to be managed in the first environment, based on the relevant information generated by the first generating process and a second learned model to be used for inference by the target object to be managed in the second environment; and
        a transmission process for transmitting the first learned model generated by the second generation process to the target object to be managed, and
    wherein, in the first generation process, the processor generates the relevant information based on a matched number of edge information between existing edge information in the first environmental information and edge information on a new edge terminal in the second environmental information.

2. The management device according to claim 1, wherein:
    in the reception process, the processor receives the first environmental information representing the first environment of a first data processing device as one target object to be managed;
    in the first generation process, the processor generates the relevant information representing relevancy between the first environmental information and the second environmental information representing the second environment of the second data processing device as one target object to be managed;
    in the second generation process, the processor generates the first learned model to be used for inference by the first data processing device in the first environment, based on the relevant information and the second learned model to be used for inference by the second data processing device in the second environment; and
    in the transmission process, the processor transmits the first learned model to the first data processing device.

3. The management device according to claim 2, wherein the first environmental information and the second environmental information have values of a plurality of environmental items each of which defines an environment common to the first environmental information and the second environmental information, and
wherein the matched number of edge information includes matched number of values of same environmental items between the first environmental information and the second environmental information.

4. The management device according to claim 3, wherein:
each of the plurality of environmental items has a level of importance which is set in association therewith; and
in the first generation process, the processor generates the relevant information, based on the matched number of values of the same environmental items between the first environmental information and the second environmental information and the level of importance of the environmental items.

5. The management device according to claim 2, wherein, in the reception process, the processor receives the first environmental information, when the first data processing device is newly added as the target object to be managed.

6. The management device according to claim 2, wherein, in the reception process, when the first environmental information has newly been added in the first data processing device, the processor receives the newly added first environmental information.

7. The management device according to claim 5, wherein, in the second generation process, the processor stores the first environmental information as the second environmental information.

8. The management device according to claim 1, wherein:
the communication interface is communicable with a communication device which performs learning with a dataset which is a combination of an inference result of the target object to be managed and correct data corresponding to the inference result; and
in the second generation process, the processor updates the first learned model to a learned result from the communication device.

9. The management device according to claim 1, wherein, in the first generation process, the processor generates relevant information representing relevancy between the first environmental information and the second environmental information representing the second environment of the target object to be managed at a time point earlier than a time point of the first environmental information.

10. The management device according to claim 9, wherein, in the first generation process, the processor generates relevant information representing relevancy between first environmental information which has newly been received by the reception process and the second environmental information.

11. The management device according to claim 10, wherein, in the second generation process, the processor stores the first environmental information as the second environmental information.

12. A management method to be executed by a management device accessible to a target object to be managed, the management device comprising a processor executing a program, a storage device storing the program, and a communication interface communicable with the target object to be managed, the method comprising following processes to be executed by the processor:
a reception process for receiving first environmental information representing a first environment of the target object to be managed;
a first generation process for generating relevant information representing relevancy between the first environmental information received by the reception process and second environmental information representing a second environment of the target object to be managed;
a second generation process for generating a first learned model to be used for inference by the target object to be managed in the first environment, based on the relevant information generated by the first generation process and a second learned model to be used for inference by the target object to be managed in the first environment; and
a transmission process for transmitting the first learned model generated by the second generation process to the target object to be managed,
wherein, in the first generation process, the processor generates the relevant information based on a matched number of edge information between existing edge information in the first environmental information and edge information on a new edge terminal in the second environmental information.

13. A management program embodied on a non-transitory computer readable memory storing instructions for controlling a processor to execute processes for managing a target object to be managed, the processor executing:
a reception process for receiving first environmental information representing a first environment of the target object to be managed;
a first generation process for generating relevant information representing relevancy between the first environmental information received by the reception process and second environmental information representing a second environment of the target object to be managed;
a second generation process for generating a first learned model to be used for inference by the target object to be managed in the first environment, based on the relevant information generated by the first generation process and a second learned model to be used for inference by the target object to be managed in the second environment; and
a transmission process for transmitting the first learned model generated by the second generation process to the target object to the managed,
wherein, in the first generation process, the processor generates the relevant information based on a matched number of edge information between existing edge information in the first environmental information and edge information on a new edge terminal in the second environmental information.

* * * * *